(12) United States Patent
Fujinoki et al.

(10) Patent No.: US 8,054,732 B2
(45) Date of Patent: Nov. 8, 2011

(54) OPTICAL RECORDING AND REPRODUCING APPARATUS HAVING AN OPTICAL PICKUP INCLUDING A LIQUID CRYSTAL CORRECTING ELEMENT

(75) Inventors: Shinichi Fujinoki, Tokorozawa (JP); Hisao Tanaka, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 467 days.

(21) Appl. No.: 12/294,572

(22) PCT Filed: Mar. 12, 2007

(86) PCT No.: PCT/JP2007/054806
§ 371 (c)(1),
(2), (4) Date: Oct. 16, 2008

(87) PCT Pub. No.: WO2007/111114
PCT Pub. Date: Oct. 4, 2007

(65) Prior Publication Data
US 2009/0115921 A1 May 7, 2009

(30) Foreign Application Priority Data

Mar. 29, 2006 (JP) ................................ 2006-090931

(51) Int. Cl.
*G11B 7/00* (2006.01)
(52) U.S. Cl. ................ 369/112.02; 369/53.37; 369/53.2
(58) Field of Classification Search ............. 369/112.02, 369/53.37, 53.2
See application file for complete search history.

(56) References Cited

U.S. PATENT DOCUMENTS

| 6,738,332 B2 * | 5/2004 | Sato et al. ................. 369/53.28 |
| 2005/0083824 A1 * | 4/2005 | Ogasawara ............. 369/112.02 |
| 2006/0153024 A1 * | 7/2006 | Lee et al. .................. 369/44.28 |

FOREIGN PATENT DOCUMENTS

| JP | 2004-185758 | 7/2004 |
| JP | 2005-122828 | 5/2005 |
| JP | 2005-276393 | 10/2005 |
| JP | 2005-332519 | 12/2005 |

\* cited by examiner

*Primary Examiner* — LaTanya Bibbins
(74) *Attorney, Agent, or Firm* — Drinker Biddle & Reath LLP

(57) ABSTRACT

An optical recording and reproducing apparatus which suppresses the generation of a noise component in a servo signal while preventing a deterioration in using efficiency of a light beam is provided. The optical recording and reproducing apparatus has an optical pickup including a liquid crystal correcting element, a liquid crystal element control unit, a memory, and an operation mode control unit. The memory stores a plurality of correction data sets respectively corresponding to a plurality of refractive index distribution to be formed by the liquid crystal correcting element. The liquid crystal element control unit selectively reads out the correction data set corresponding to the operation mode designated by the operation mode control unit from the memory and supplies a driving voltage according to the read-out correction data set to the liquid crystal correcting element.

7 Claims, 7 Drawing Sheets

(A)

(B)

OPTICAL RECORDING AND REPRODUCING APPARATUS HAVING AN OPTICAL PICKUP INCLUDING A LIQUID CRYSTAL CORRECTING ELEMENT

TECHNICAL FIELD

The invention relates to a technique for correcting a wavefront aberration which occurs in an optical pickup for recording or reading information to/from an optical recording medium such as an optical disc and, more particularly, to a technique for correcting a wavefront aberration by using a liquid crystal optical element having a birefringent liquid crystal layer.

BACKGROUND ART

An optical pickup is a device for converging a light beam onto a signal recording surface of an optical recording medium such as an optical disc and detecting the return light beam reflected by the signal recording surface. Examples of wavefront aberration that occurs in the optical pickup are, for example, an astigmatism that is caused by a shape of an optical part for guiding the light beam to the optical recording medium or a deviation from a design position of the optical part; a coma-aberration that is caused by an inclination of a normal of the signal recording surface from an optical path; a spherical aberration that is caused by a variation in thickness of cover layer with which the signal recording surface is covered; or the like. Those wavefront aberrations become a cause for, for example, distorting a spot shape of the light beam which is irradiated onto the signal recording surface and deteriorating reproducing characteristics and recording characteristics. In particular, although a recording density of the optical recording medium can be improved owing to the recent realization of a short wavelength of the light beam and high resolution of an objective lens, an aberration generation amount increases. It is, therefore, demanded to correct the wavefront aberration at a high level. As an element adapted to correct the wavefront aberration of the above kind, a liquid crystal optical element (hereinbelow, called a "liquid crystal correcting element") having a birefringent liquid crystal layer is used. Related arts regarding the liquid crystal correcting element have been disclosed in, for example, Patent Document 1 (Japanese Patent Kokai No. 2005-122828) and Patent Document 2 (U.S. Patent Application Publication No. 2005/083824).

The liquid crystal correcting element generally used has: two electrode layers which face each other; and a liquid crystal layer sealed between the electrode layers. At least one of the two electrode layers has an electrode pattern constituted by a plurality of electrode segments in order to correct a wavefront aberration component. A driving circuit can apply desired electric field distribution to the liquid crystal layer between the electrode layers by individually applying a driving voltage to the electrode segments. Since a liquid crystal molecule in the liquid crystal layer is oriented in accordance with the electric field distribution, a light transmitting medium having refractive index distribution which differs locally in accordance with an orientation state of the liquid crystal molecule is obtained. Since an optical path length of the light beam is proportional to a product of a refractive index of the light transmitting medium and a geometrical distance, the refractive index distribution which can set off the wavefront aberration can be obtained.

When driving the liquid crystal correcting element, the driving circuit calls a correction data set which has previously been stored in a nonvolatile memory and generates a driving voltage to be applied to each electrode segment in accordance with a value of the correction data set. Since the generation amount of the wavefront aberration can be predicted to a certain extent at a design stage of the optical pickup, the value of the correction data set is set, for example, in such a manner that the refractive index distribution adapted to properly correct the astigmatism component or spherical aberration component occurs in the liquid crystal layer of the liquid crystal correcting element. If the wavefront aberration is properly corrected, the distortion of the spot shape of the light beam which is irradiated onto the optical recording medium is corrected and a level of an RF signal rises, so that a using efficiency of the light beam is improved.

When the correction of the wavefront aberration is properly effected, however, there is a case where a servo is contrarily made unstable. For example, when the wavefront aberration is properly corrected, there is a case where a noise component included in a focusing error signal becomes recognizable. The noises of a radio frequency component causes an actuator for driving the objective lens to generate a heat and there is a case where the heat causes a peel-off of a reflection preventing film of the objective lens or a dissolution of the objective lens. If the wavefront aberration is corrected to such an extent that the noise component included in a focusing error signal is not recognizable, the efficiency of utilization of the light beam decreases.

Patent Document 1: Japanese patent Kokai No. 2005-122828
Patent Document 2: U.S. Patent Application Publication No. 2005/083824 (the laid-open publication of U.S. Patent Application corresponding to Patent Document 1)

DISCLOSURE OF INVENTION

In consideration of the above points, it is a main object of the invention to provide an optical recording and reproducing apparatus which can suppress the generation of a noise component in a servo signal while preventing a deterioration in using efficiency of a light beam.

According to an embodiment of the invention, there is provided an optical recording and reproducing apparatus equipped with an optical pickup having a light source for emitting a light beam, a liquid crystal correcting element which includes a liquid crystal layer arranged between two electrode layers which face each other and modulates a phase of the light beam, an objective lens for converging the modulated light beam onto a signal recording surface of an optical recording medium, and an optical system for guiding the light beam to the liquid crystal correcting element, comprising: a memory for storing a plurality of correction data sets respectively corresponding to a plurality of refractive index distribution to be formed by the liquid crystal correcting element; an operation mode control unit for designating an operation mode of the optical pickup; a liquid crystal element control unit for selectively reading out the correction data set corresponding to the operation mode designated by the operation mode control unit from the memory and applying a driving voltage according to the read-out correction data set to the electrode layers; a signal detecting unit for forming a servo signal on the basis of the return light beam reflected by the signal recording surface; and a servo control unit for controlling an operation of the optical pickup on the basis of the servo signal in the operation mode designated by the operation mode control unit.

DESCRIPTION OF REFERENCE NUMERALS

Figure 1:
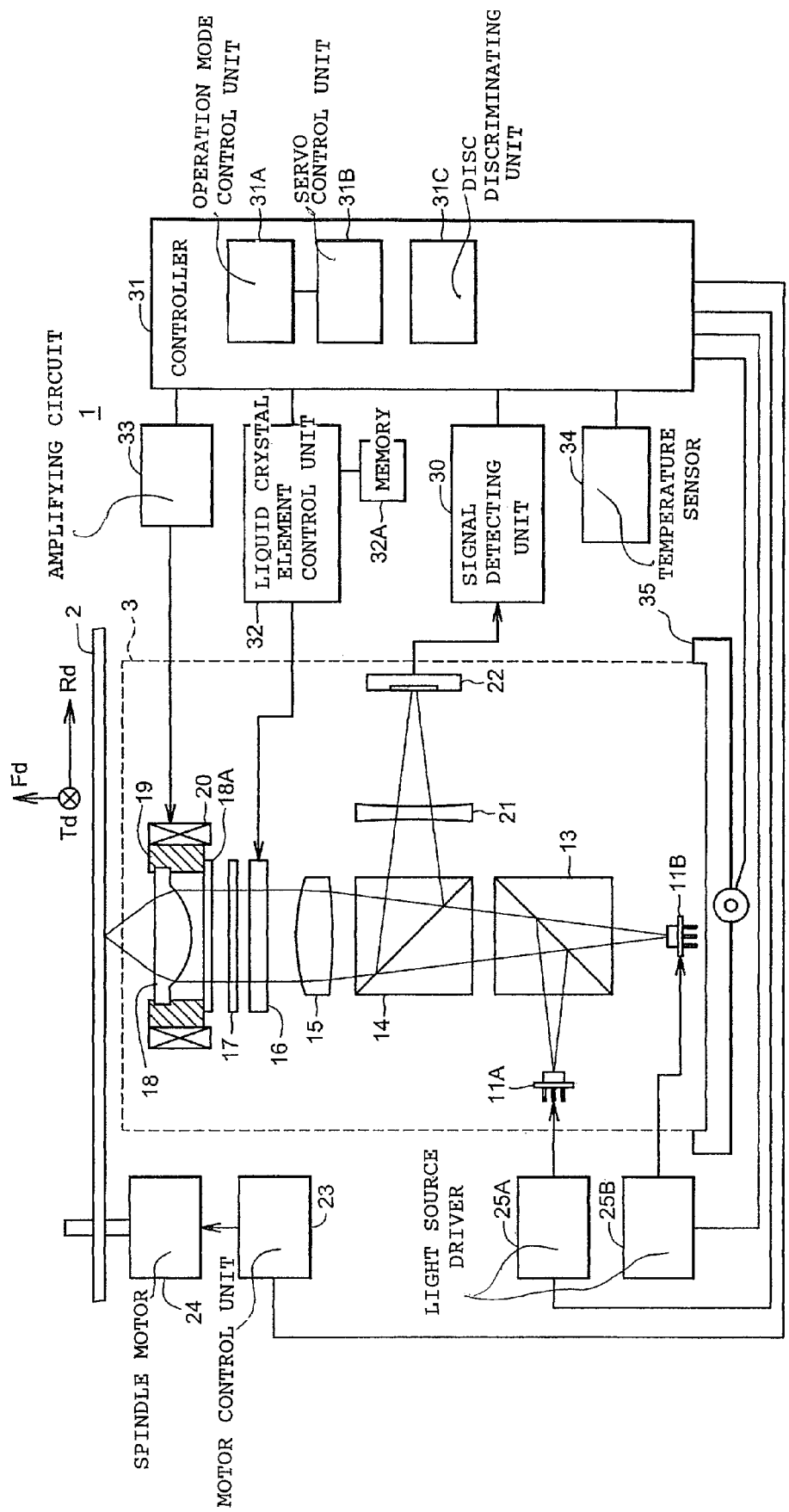
FIG. 1 is a diagram showing a schematic construction of an optical recording and reproducing apparatus according to an embodiment of the invention.

1 Optical recording and reproducing apparatus
2 Optical recording medium
3 Optical pickup
16 Liquid crystal element (liquid crystal correcting element
18 Objective lens
19 Lens holder
20 Actuator
22 Photodetector
30 Signal detecting unit
31 Controller
32 Liquid crystal element control unit
32A Nonvolatile memory
34 Temperature sensor

MODE FOR CARRYING OUT THE INVENTION

The present application claims priority from Japanese Patent Application JP-2006-090931, the content of the basic application is hereby incorporated into this application.

Various kinds of embodiments according to the invention will be described hereinbelow.

FIG. 1 is a diagram showing a schematic construction of an optical recording and reproducing apparatus 1 according to an embodiment of the invention. The recording and reproducing apparatus 1 has: an optical pickup 3; a spindle motor 24; a motor control unit 23; light source drivers 25A and 25B; a signal detecting unit 30; a controller 31; a liquid crystal element control unit 32; an amplifying circuit 33; a temperature sensor 34; and moving means 35. The controller 31 has a function for controlling the operation of each of those component elements 32, 25A, 25B, 30, 32, 33, and 34 and can be realized by, for example, a microcomputer. Although the controller 31 and the liquid crystal element control unit 32 have independent constructions in the embodiment, they can be also realized by a single microcomputer.

The optical pickup 3 includes: a first laser light source 11A; a second laser light source 11B; a synthetic prism (dichroic prism) 13; a beam splitter 14; a collimator lens 15; a liquid crystal element (liquid crystal correcting element) 16; a quarter wave plate 17; a selecting filter 18A; an objective lens 18; a center lens 21; and a photodetector 22. The objective lens 18 is fixed to a lens holder 19. The lens holder 19 is attached to an actuator 20 for biaxial driving or triaxial driving. An "aberration correcting apparatus" of the invention can be constructed by the liquid crystal element 16 and the liquid crystal element control unit 32.

An optical recording medium 2 is put on a turntable (not shown) of a disc attaching unit. The spindle motor 24 is driven to rotate the optical recording medium 2 around a center axis thereof in accordance with a drive signal which is supplied from the motor control unit 23. As a kind of optical recording medium 2, for example, although a CD (Compact Disc), a DVD (Digital Versatile Disc), a BD (Blu-ray Disc), or an AOD (Advanced Optical Disc) can be mentioned, the invention is not limited to them.

The first laser light source 11A generates a light beam of a first oscillating wavelength (for example, about 785 nm) according to the standard of the optical disc in accordance with a drive signal supplied from the first light source driver 25A. After the light beam was emitted from the laser light source 11A, it enters the synthetic prism 13. The light beam reflected by the synthetic prism 13 enters the collimator lens 15 through the beam splitter 14. After the collimator lens 15 converted the incident light into parallel light, it emits the parallel light to the liquid crystal element 16. The liquid crystal element 16 modulates a phase of the incident light beam and emits the modulated light beam to the quarter wave plate 17. After the modulated light beam was converted from linear polarization light into circular polarization light by the quarter wave plate 17, it enters the objective lens 18 through the selecting filter 18A. The objective lens 18 converges the incident light from the selecting filter 18A onto a signal recording surface of the optical recording medium 2.

The second laser light source 11B generates a light beam of a second oscillating wavelength (for example, about 660 nm) according to the standard of the optical disc in accordance with a drive signal supplied from the second light source driver 25B. After the light beam was emitted from the laser light source 11B, it passes through the synthetic prism 13 and the beam splitter 14 in this order, is converted into parallel light by the collimator lens 15, and thereafter, enters the liquid crystal element 16. The liquid crystal element 16 modulates a phase of the incident light beam and emits the modulated light beam to the quarter wave plate 17. After the modulated light beam was converted from linear polarization light into circular polarization light by the quarter wave plate 17, it enters the objective lens 18 through the selecting filter 18A. The objective lens 18 converges the incident light from the selecting filter 18A onto the signal recording surface of the optical recording medium 2. Although an optical system having an optical path for guiding the laser beam to the liquid crystal element 16 is constructed by the synthetic prism 13, beam splitter 14, and collimator lens 15, the invention is not limited to them.

The selecting filter 18A is an optical element having a ring zonal diffraction structure and a numerical aperture according to a light source wavelength corresponding to the optical disc 2 is realized. For example, in the CD standard, the light source wavelength can be set to about 780 nm and the numerical aperture can be set to 0.45, respectively. In the DVD standard, the light source wavelength can be set to about 650 nm and the numerical aperture can be set to 0.60, respectively. In the BD standard, the light source wavelength can be set to about 407 nm and the numerical aperture can be set to 0.85, respectively. The objective lens 18 having a diffraction lens structure in which ring zonal steps have been formed on one surface can be also used in place of the selecting filter 18A. The selecting filter 18A and the objective lens having the diffraction lens structure have been disclosed in, for example, the Official Gazette of Japanese Patent Kokai No. 2004-362732 (or the specification of corresponding U.S. Patent Application Publication No. 2004/223442).

Although the recording and reproducing apparatus 1 uses the two kinds of laser light sources 11A and 11B in the embodiment, three or more kinds of laser light sources may be used. For example, three kinds of laser light sources which can respectively generate light beams of oscillating wavelengths of about 405 nm, about 660 nm, and about 785 nm can be used.

The return light beam reflected by the signal recording surface of the optical recording medium 2 passes through the objective lens 18, selecting filter 18A, quarter wave plate 17, liquid crystal element 16, and collimator lens 15 in order and is guided to the center lens 21 by the beam splitter 14. The return light beam emitted from the center lens 21 is detected by the photodetector 22. The photodetector 22 converts the return light beam into an electric signal and supplies the electric signal to the signal detecting unit 30. Although an optical system having an optical path for guiding the return light beam to the photodetector 22 is constructed by the collimator lens 15, beam splitter 14, and center lens 21, the invention is not limited to them.

Based on the electric signal from the photodetector 22, the signal detecting unit 30 forms an RF signal, a tracking error signal for tracking servo control, a focusing error signal for focusing servo control, and preformat signals such as wobble signal and prepit signal and supplies those signals to the controller 31. The controller 31 can reproduce information recorded on the optical recording medium 2 from the RF signal sent from the signal detecting unit 30. A servo control unit 31B of the controller 31 executes the servo control using the tracking error signal, focusing error signal, and preformat signals and forms a drive signal so as to drive the objective lens 18. The amplifying circuit 33 amplifies the drive signal supplied from the controller 31 and supplies to the actuator 20. In accordance with the amplification signal, the actuator 20 can drive the lens holder 19 in a focusing direction (a direction close to the signal recording surface of the optical recording medium 2 or the opposite direction) Fd, a radial direction (a radial direction of the optical recording medium 2 which perpendicularly crosses the focusing direction) Rd, and a tangential direction (a direction which perpendicularly crosses the focusing direction and the radial direction) Td, respectively.

Under control of the controller 31, the moving means 35 can move the optical pickup 3 along the radial direction Rd at the time of, for example, the seeking operation (searching operation). The moving means 35 may be constructed by, for example: a guide shaft for supporting the optical pickup 3 so as to be movable in the radial direction Rd; and a carriage motor which is come into engagement with the guide shaft and rotates the guide shaft.

Figure 2:
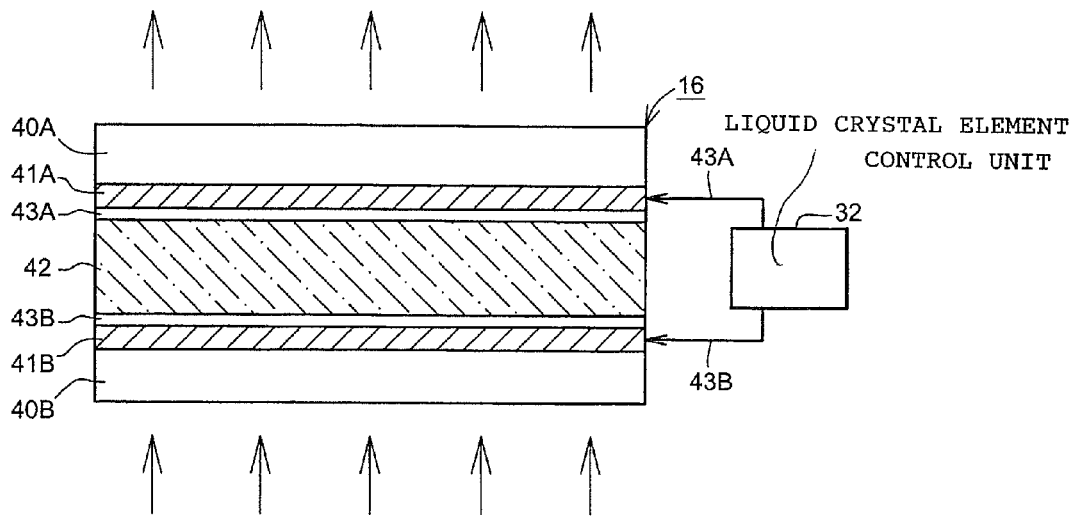
FIG. 2 is a schematic cross sectional view showing a structure of a liquid crystal element.

The liquid crystal element 16 has a liquid crystal layer made of liquid crystal molecules having a birefringence index between two electrode layers. It has been known that the liquid crystal molecules having the birefringence index are oriented along an electric field and have a different refractive index according to the orientation state. Since the liquid crystal layer forms refractive index distribution which differs locally in accordance with voltage distribution formed in the electrode layers and generates an optical path difference which differs locally, a wavefront modulation according to the optical path difference is performed to the light beam which has transmitted through the liquid crystal layer. As shown in FIG. 2, the liquid crystal element 16 has: first and second translucent substrates 40A and 40B which face each other with an interval; a first electrode layer 41A formed on the inner surface of the first translucent substrate 40A; an insulating layer 43A formed on the inner surface of the first electrode layer 41A; a second electrode layer 41B formed on the inner surface of the second translucent substrate 40B so as to face the first electrode layer 41A; an insulating layer 43B formed on the inner surface of the second electrode layer 41B; and a liquid crystal layer 42 arranged between the first and second electrode layers 41A and 41B through the insulating layers 43A and 43B. Each of the first and second electrode layers 41A and 41B can be made of a metal oxide such as ITO (Indium Tin Oxide: indium oxide added with tin). Each of the first and second insulating layers 43A and 43B can be made of a translucent insulating material such as polyimide. The liquid crystal layer 42 contains liquid crystal molecules having a birefringence index and those liquid crystal molecules are oriented by orientation films (not shown) formed respectively on the inner surfaces of the insulating layers 43A and 43B.

Figure 3:
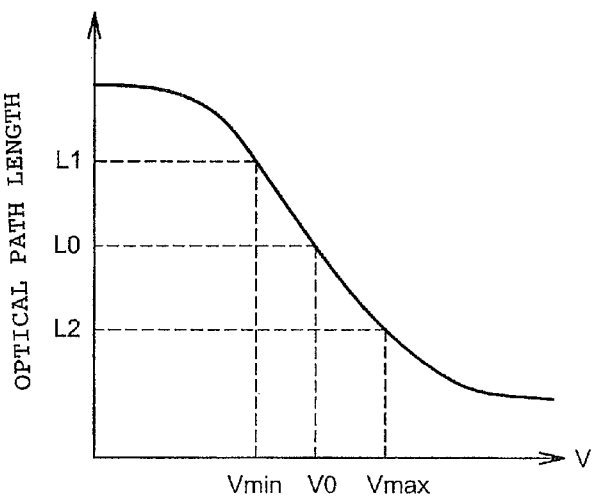
FIG. 3 is a graph schematically showing a relation between a driving voltage and an optical path length.

The liquid crystal element control unit 32 supplies a driving voltage 43A to the first electrode layer 41A and supplies a driving voltage 43B to the second electrode layer 41B, thereby enabling predetermined electric field distribution to be applied to the liquid crystal layer 42 between the first and second electrode layers 41A and 41B. The liquid crystal molecules in the liquid crystal layer 42 are oriented in accordance with the electric field distribution, thereby forming the refractive index distribution which differs locally. As mentioned above, since the optical path length of the light beam is proportional to the product of the refractive index of the light transmitting medium and the geometrical distance, the light beam which has passed through the liquid crystal element 16 is subjected to a spatial phase modulation or a wavefront modulation in accordance with the refractive index distribution in the liquid crystal layer 42. FIG. 3 is a graph schematically showing a relation between an amplitude (=V) of the driving voltage at the time when a reference voltage has been applied to one of the electrode layers 41A and 41B and the driving voltage has been applied to the other and the optical path length. As shown in the graph of FIG. 3, a voltage range (Vmin~Vmax) where the optical path length changes almost linearly to a change in amplitude of the driving voltage exists. The liquid crystal element control unit 32 supplies the reference voltage of an amplitude V0 in an initial state, thereby uniformly causing an optical path length L0 in the whole liquid crystal layer 42. The liquid crystal element control unit 32 supplies the driving voltage of a positive or negative voltage polarity for the reference voltage, thereby enabling the optical path length to be locally decreased or increased from the optical path length L0 serving as a reference. An optical path length difference (OPD: Optical Path Difference) which can set off the wavefront aberration can be, thus, caused.

Figure 4:
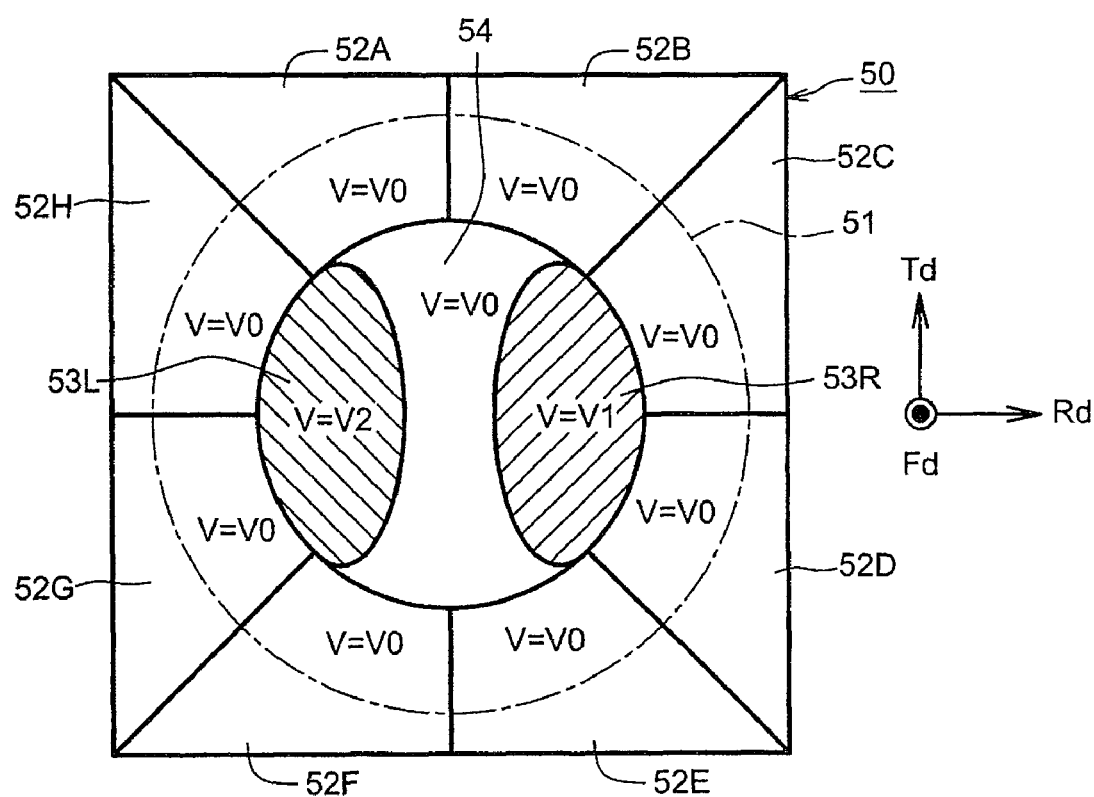
FIG. 4 is a diagram schematically showing an example of an electrode structure.

FIG. 4 is a diagram schematically showing an example of an electrode structure 50 of the liquid crystal element 16. The electrode structure 50 is constructed by a plurality of electrode segments 52A, 52B, 52C, 52D, 52E, 52F, 52G, 52H, 53R, 53L, and 54 which are mutually electrically insulated. Those electrode segments are formed so as to be arranged in a plane area 51 corresponding to an effective diameter of the objective lens 18. An electrode pattern adapted to correct an astigmatism component is constructed by the electrode segments 52A, 52B, 52C, 52D, 52E, 52F, 52G, and 52H arranged concentrically. An electrode pattern adapted to correct a coma-aberration component is constructed by a pair of electrode segments 53R and 53L arranged in the radial direction Rd. Both of the coma-aberration component and the astigmatism component can be corrected by using the electrode structure 50.

Figure 5:
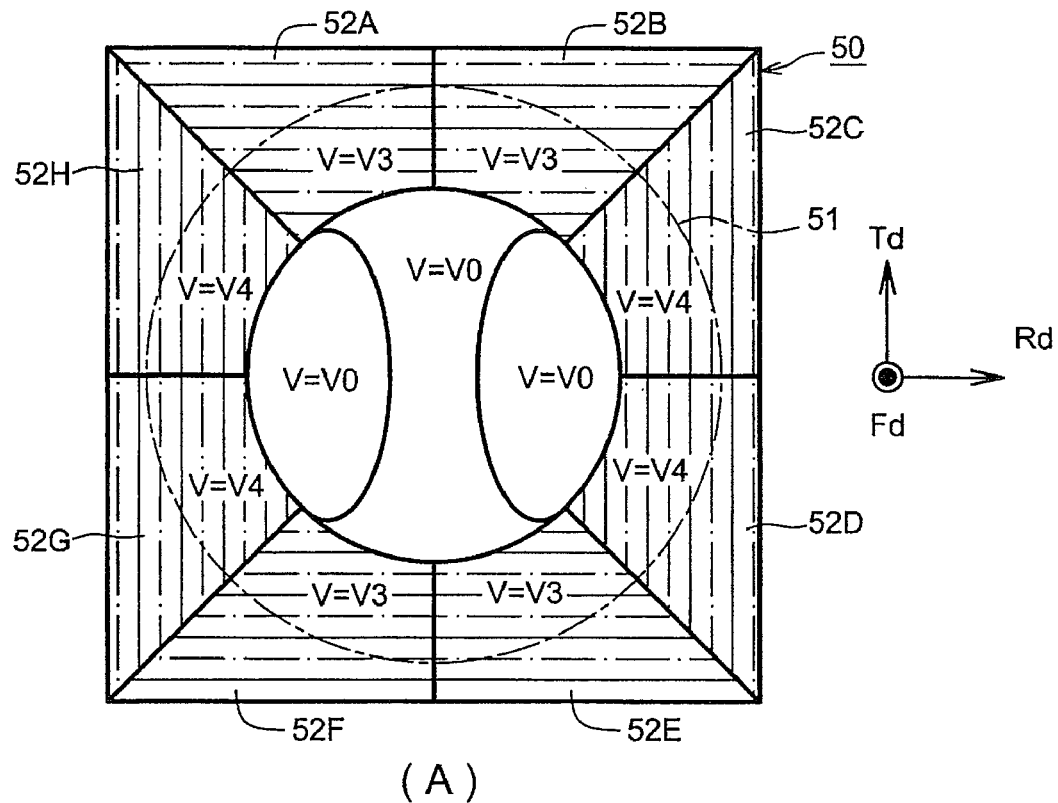
FIGS. 5(A) and 5(B) are diagrams each schematically showing an example of the electrode structure.
Figure 5:
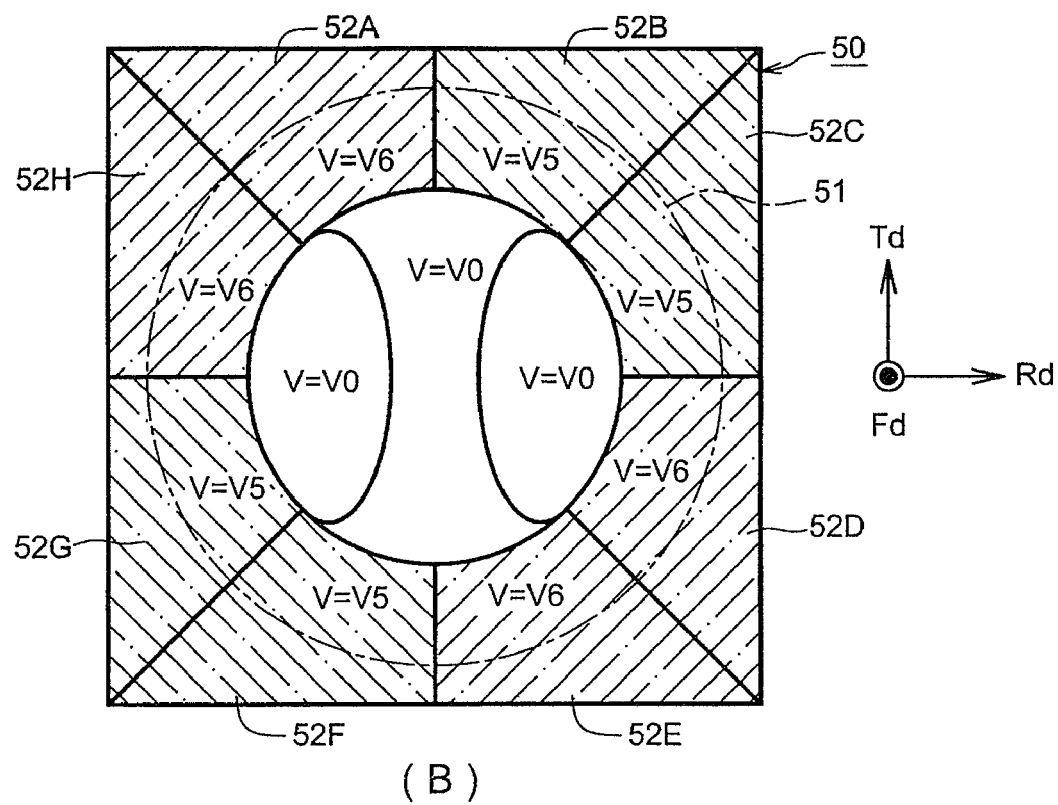

When only the coma-aberration component in the wavefront aberration is corrected, as shown in FIG. 4, the voltage V0 which is applied to the electrode segment 54 is used as a reference, a driving voltage V1 is applied to the electrode segment 53R, and a driving voltage V2 whose polarity is opposite to that of the voltage V1 is applied to the electrode segment 53L. The astigmatism can be mainly dissolved into:

a 0° component and a 90° component which appear in the radial direction Rd and the tangential direction Td; and ±45° components which appear in the directions which are inclined from the tangential direction Td to the radial direction Rd by ±45°. When only the 0° component and 90° component of the astigmatism are corrected, as shown in FIG. 5(A), a driving voltage V3 is applied to the electrode segments 52A, 52B, 52F, and 52E and a driving voltage V4 whose polarity is opposite to that of the voltage V3 is applied to the electrode segments 52C, 52D, 52G, and 52H. When only the ±45° components of the astigmatism are corrected, as shown in FIG. 5(B), a driving voltage V5 is applied to the electrode segments 52B, 52C, 52F, and 52G and a driving voltage V6 whose polarity is opposite to that of the voltage V5 is applied to the electrode segments 52A, 52H, 52D, and 52E.

By causing a combination of the voltage distribution in FIG. 4 and voltage distribution in FIGS. 5(A) and 5(B), the liquid crystal element control unit 32 can simultaneously correct the 0° component, 90° component, and ±45° components.

The two kinds of laser light sources 11A and 11B have been assembled in the recording and reproducing apparatus 1 of the embodiment. Since the different wavefront aberration occurs every wavelength of the laser beam, it is necessary to individually correct the aberration in the case of using the first laser light source 11A and the case of using the second laser light source 11B. The different wavefront aberration occurs in accordance with the kind of optical recording medium 2 which is loaded and, further, the different wavefront aberration occurs in accordance with an internal temperature of the recording and reproducing apparatus 1. A plurality of correction data sets corresponding to the plurality of refractive index distribution to be caused in the liquid crystal element 16 in accordance with a situation, therefore, have been stored in a nonvolatile memory 32A. Under control of an operation mode control unit 31A, the liquid crystal element control unit 32 can selectively read out the correction data set from the nonvolatile memory 32A and supply the driving voltage according to the read-out correction data set to the liquid crystal element 16. The liquid crystal element 16 generates the refractive index distribution according to the driving voltage from the liquid crystal element control unit 32 and modulates the phase of the incident light beam.

As mentioned above, if the wavefront aberration is accurately corrected, there is a case where a situation where the noise component included in the servo signal is revealed and the servo becomes unstable occurs. The revealed noise component leaks into, for example, the focusing error signal and causes the actuator 20 to generate a heat, so that there is a risk that the heat causes a peel-off of the reflection preventing film of the objective lens 18 or a dissolution of the objective lens 18. One of the causes of the reveal of the noise component as mentioned above relates to a point that an aberration correcting state which minimizes the noise component contained in the servo signal and an aberration correcting state which minimizes the generation amount of the wavefront aberration do not always coincide.

Figure 6:
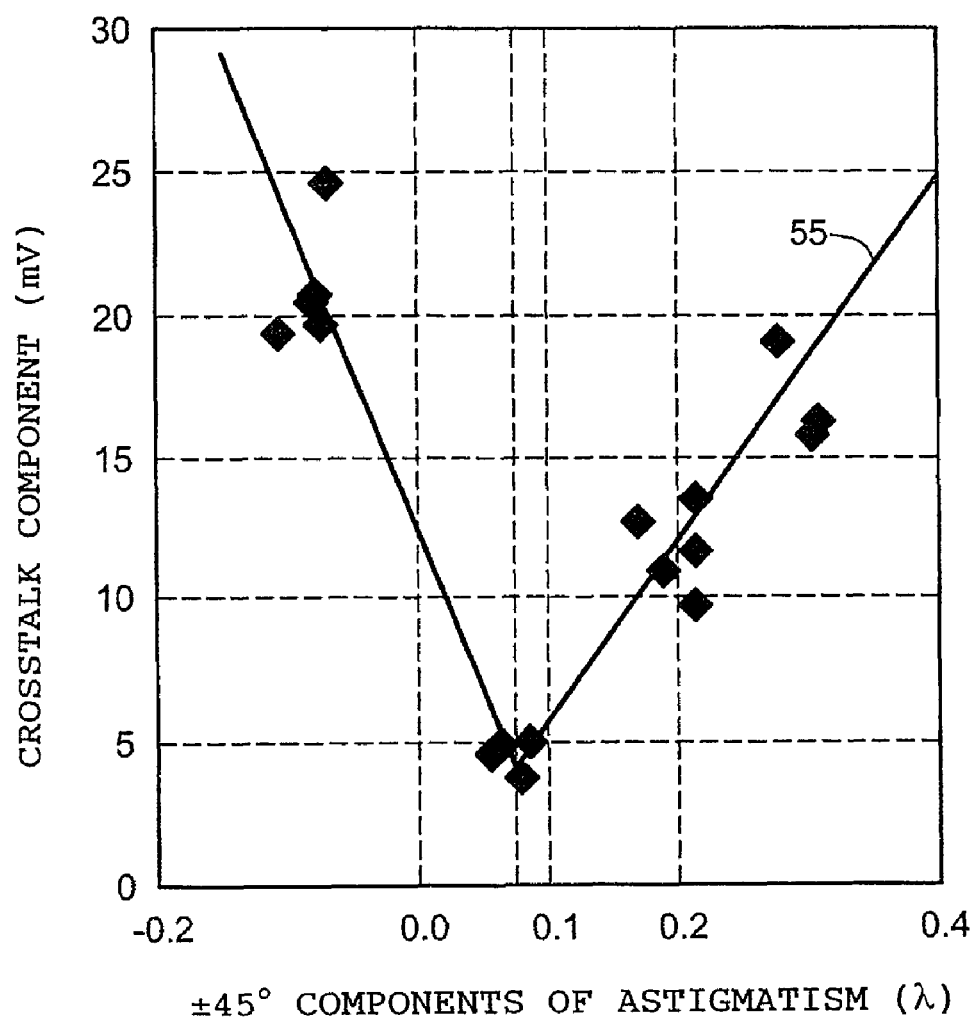
FIG. 6 is a graph showing a measuring level of a crosstalk component (noise component) to ±45° components of an astigmatism.

FIG. 6 is a graph showing a measuring level of a crosstalk component (noise component) of the focusing error signal to the ±45° components of the astigmatism. In the graph, λ denotes a wavelength (about 660 nm) of the light beam and a curve 55 denotes a recursive curve obtained from measurement values. According to the recursive curve 55, it will be understood that when a value of the 45° component of the astigmatism is equal to about 0.74λ, although the generation amount of the crosstalk component of the focusing error signal becomes minimum, as the value of the 45° component of the astigmatism is reduced from about 0.74λ to about 0λ, the measuring level of the crosstalk component increases. If the wavefront aberration is, therefore, accurately corrected so that the generation amount of the ±45° components is equal to almost zero, there is a possibility that a case where the crosstalk component contained in the focusing error signal is revealed and the operation of the actuator 20 becomes unstable occurs.

For example, at the time of the seeking operation in which the optical pickup 3 moves along the radial direction Rd, a convergent spot transverses a recording track on the optical recording medium 2 and the crosstalk component (noise component) occurs in the focusing error signal. At this time, if the wavefront aberration is accurately corrected so that the generation amount of the ±45° components of the astigmatism is equal to almost zero, there is a case where the signal level of the crosstalk component exceeds a permission value.

In the recording and reproducing apparatus 1 of the embodiment, the liquid crystal element control unit 32 can selectively read out the correction data set corresponding to the operation mode designated by the operation mode control unit 31A from the nonvolatile memory 32A and generates the driving voltage in accordance with the read-out correction data set. The refractive index distribution which differs every operation mode, therefore, can be formed in the liquid crystal element 16.

For example, upon manufacturing of the recording and reproducing apparatus 1, the following correction data sets can be stored into the nonvolatile memory 32A: a correction data set A which has been set so that the refractive index distribution which minimizes the generation amount of the wavefront aberration component such as astigmatism component or spherical aberration component under predetermined conditions is formed in the liquid crystal element 16; and a correction data set B which has been set so that the refractive index distribution which minimizes the generation amount of the noise component contained in the focusing error signal at the time of the seeking operation under predetermined conditions is formed in the liquid crystal element 16. In the above case, in the operation mode in which the normal tracking servo control is executed, the correction data set A can be selected so that the refractive index distribution which maximizes the using efficiency of the light beam is formed in the liquid crystal element 16. At the time of the seeking operation of the optical pickup 3, the correction data set B can be selected so that the refractive index distribution which corrects the wavefront aberration to such an extent that the crosstalk component contained in the focusing error signal is not revealed is formed in the liquid crystal element 16.

Figure 7:
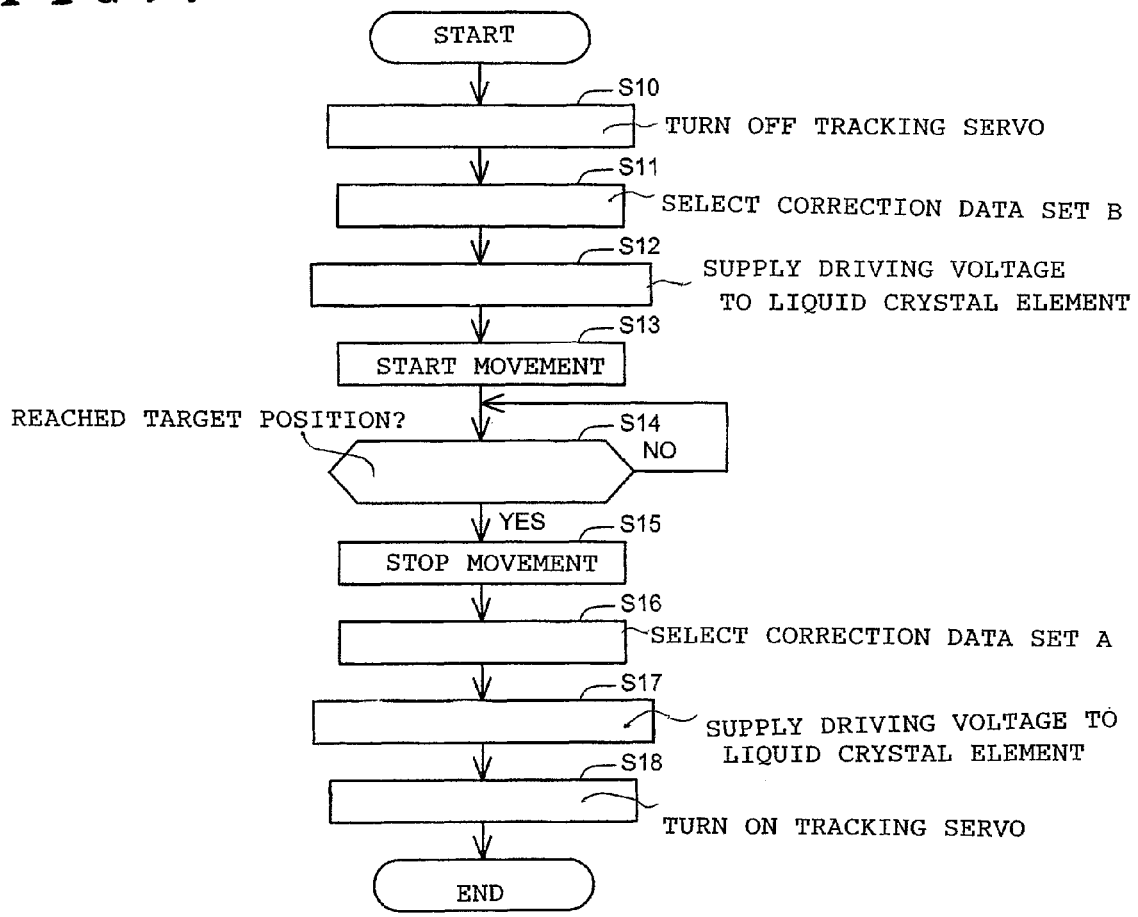
FIG. 7 is a flowchart schematically showing a procedure of a seek control process.

FIG. 7 is a flowchart schematically showing a procedure of a seek control process of the embodiment. When a seek command is received from a host apparatus (not shown), the operation mode control unit 31A designates a seek operation mode and, in response to the designation, the servo control unit 31B turns off the tracking servo (step S10). The liquid crystal element control unit 32 selectively reads out the correction data set B from the nonvolatile memory 32A in accordance with the seek operation mode (step S11), forms the driving voltage according to the correction data set B, and supplies it to the liquid crystal element 16 (step S12). The refractive index distribution which minimizes the generation amount of the noise component contained in the focusing error signal at the time of the seeking operation is, thus, formed in the liquid crystal layer of the liquid crystal element 16.

Subsequently, the controller 31 controls the moving means 35, thereby starting the movement of the optical pickup 3 toward a target position (step S13). When the optical pickup 3 reaches the target position (step S14), the controller 31 allows the moving means 35 to stop the movement of the optical pickup 3 (step S15). Subsequently, the liquid crystal element control unit 32 selectively reads out the original correction data set A from the nonvolatile memory 32A (step S16), forms the driving voltage according to the correction data set A, and supplies it to the liquid crystal element 16 (step S17). The refractive index distribution which maximizes the using efficiency of the light beam is, thus, formed in the liquid crystal layer of the liquid crystal element 16. After that, the operation mode control unit 31A cancels the seek operation mode and the servo control unit 31B turns on the tracking servo in response to the cancellation (step S18). In this manner, the seek control process is finished.

As mentioned above, in the seek operation mode, since the liquid crystal element control unit 32 switches the correction data set which is used to form the driving voltage to the correction data set B, also in the seeking operation, the noise component contained in the focusing error signal is not revealed but the stable focusing servo can be realized. It is possible to prevent such a situation that the actuator 20 generates the heat due to the reveal of the noise component which distorts the waveform of the focusing error signal and the occurrence of the peel-off of the reflection preventing film of the objective lens 18 or the dissolution of the objective lens 18 occurs.

Figure 8:
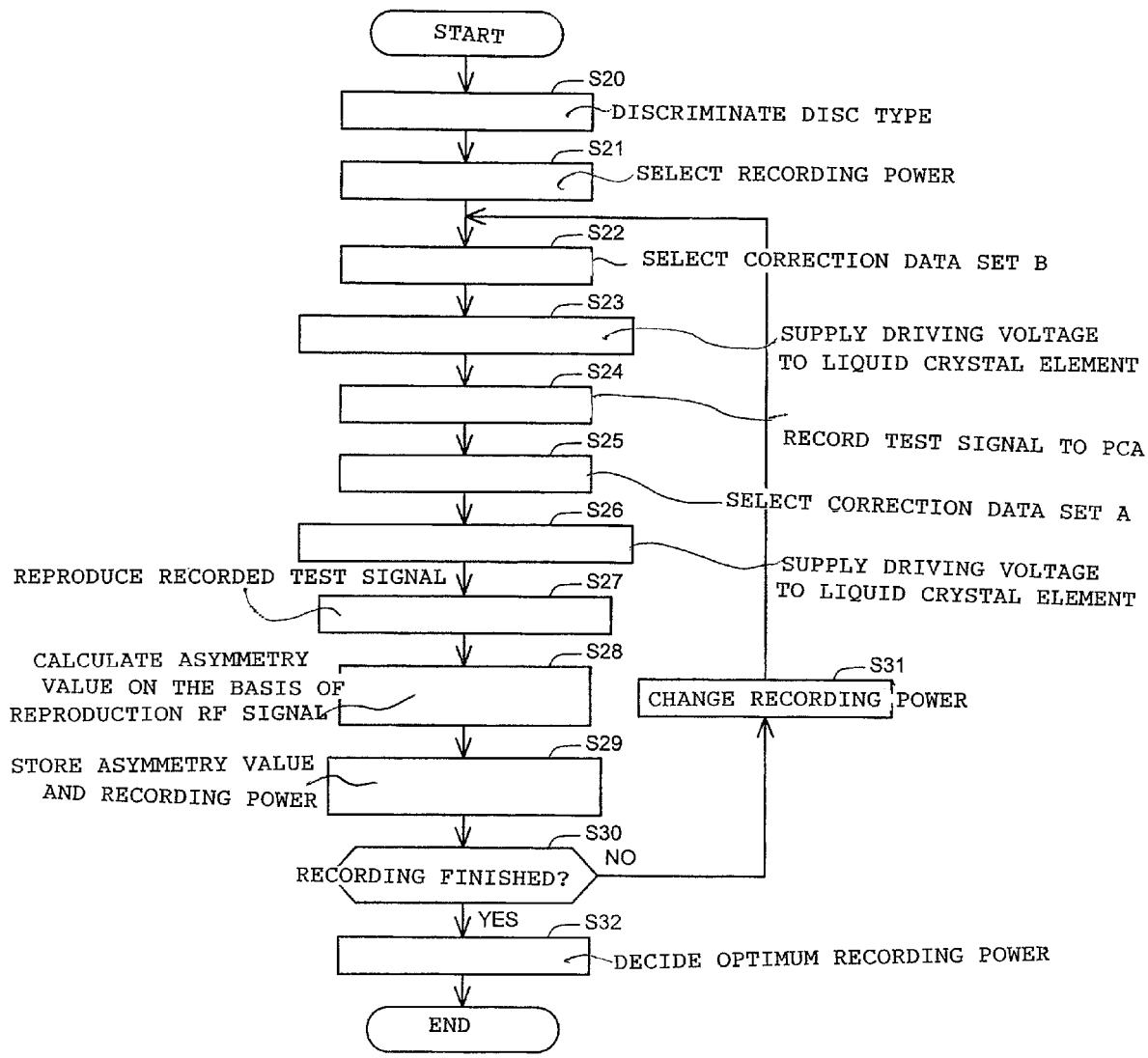
FIG. 8 is a flowchart schematically showing a procedure of a control process in an OPC operation mode.

Subsequently, a control process in the operation mode of the OPC (optimum recording power adjustment: Optimum Power Calibration) will be described. FIG. 8 is a flowchart schematically showing a procedure of the control process. Generally, output powers of the laser light sources 11A and 11B fluctuate in dependence on characteristics of the optical recording medium 2 or a circumferential environment such as a peripheral temperature. The OPC is a method of optimizing the output powers of the laser light sources 11A and 11B in accordance with the circumferential environment.

Referring to FIG. 8, when an OPC command is received from the host apparatus (not shown), the operation mode control unit 31A designates an OPC operation mode and, in response to the designation, a disc discriminating unit (medium discriminating unit) 31C discriminates the type of loaded optical recording medium 2 (step S20). Subsequently, the controller 31 selects a recording power of the light beam to be irradiated to an adjusting area called a PCA (Power Calibration Area) of the optical recording medium 2 (step S21). The liquid crystal element control unit 32 selectively reads out the correction data set B from the nonvolatile memory 32A in accordance with the OPC operation mode (step S22), forms the driving voltage according to the correction data set B, and supplies it to the liquid crystal element 16 (step S23). At this time, the data set corresponding to the type of optical recording medium 2 is selected as a correction data set B. The refractive index distribution which minimizes the generation amount of the noise component contained in the servo signal when a test signal is recorded into the PCA is, thus, formed in the liquid crystal layer of the liquid crystal element 16.

After that, the controller 31 controls the light source driver 25A or 25B so as to irradiate a light beam for recording to the PCA, thereby recording the test signal into the PCA (step S24). Specifically speaking, a test pattern formed by continuous marks of a first pit length of a predetermined number and continuous marks of a second pit length of a predetermined number is recorded into a predetermined area in the PCA. For example, it is sufficient to record 3T marks as marks of the first pit length and 8T marks as marks of the second pit length, respectively.

Subsequently, the liquid crystal element control unit 32 selectively reads out the correction data set A from the nonvolatile memory 32A (step S25), forms the driving voltage according to the correction data set A, and supplies it to the liquid crystal element 16 (step S26). The refractive index distribution which maximizes the using efficiency of the light beam is, thus, formed in the liquid crystal layer of the liquid crystal element 16. After that, the recorded test signal is reproduced from the optical recording medium 2 (step S27). That is, the light beam for reproduction is irradiated to the PCA and its reflection light is detected by the photodetector 22. The signal detecting unit 30 forms a reproduction RF signal on the basis of an electric signal from the photodetector 22 and supplies the reproduction RF signal to the controller 31.

The controller 31 calculates an asymmetry value on the basis of the reproduction RF signal reproduced from the marks of the first pit length and the reproduction RF signal reproduced from the marks of the second pit length (step S28). Specifically speaking, the controller 31 detects a peak value ($=Vp1$) and a bottom value ($=Vb1$) of an envelope of the reproduction RF signal reproduced from the marks of the first pit length and calculates an amplitude center voltage Vc1 ($=(Vp1+Vb1)/2$) of the reproduction RF signal from the peak value and the bottom value. The controller 31 detects a peak value ($=Vp2$) and a bottom value ($=Vb2$) of an envelope of the reproduction RF signal reproduced from the marks of the second pit length and calculates an amplitude center voltage Vc2 ($=(Vp2+Vb2)/2$) of the reproduction RF signal from the peak value and the bottom value. When an amplitude of the envelope of the reproduction RF signal reproduced from the marks of the second pit length is shown by Ipp ($=Vp2-Vb2$), the asymmetry value can be defined by, for example, $(Vc2-Vc1)/Ipp$.

Subsequently, the controller 31 stores the asymmetry value and a value of a recording power corresponding thereto (step S29). After that, whether or not the recording of the test signal is finished is discriminated (step S30). If the recording is not finished, the recording power is changed (step S31). After that, the processes of steps S22 to S30 are repetitively executed.

When the recording of the test signal is finished (step S30), the controller 31 determines the recording power, as an optimum recording power, whose asymmetry value is closest to a predetermined target value among the recording powers stored in step S29 (step S32). In this manner, the control process of the OPC operation mode is finished.

As mentioned above, in the OPC operation mode, the liquid crystal element control unit 32 uses the correction data set B at the time of recording the test signal onto the optical recording medium 2 and uses the correction data set A at the time of reproducing the test signal recorded on the optical recording medium 2. Upon recording of the test signal onto the optical recording medium 2, therefore, the noise component contained in the servo signal is not revealed and the stabilization of the focusing servo and tracking servo can be realized.

When the recording and reproducing apparatus 1 can selectively execute either the focusing servo control based on the astigmatism method or the focusing servo control based on the differential astigmatism method, the liquid crystal element control unit 32 can also select the correction data set B in the operation mode in which the focusing servo control based on the astigmatism method is executed and select the correction data set A in the operation mode in which the focusing servo control based on the differential astigmatism method is executed.

In this case, the signal detecting unit 30 forms the focusing error signal based on the astigmatism method and the focusing error signal based on the differential astigmatism method and supplies those focusing error signals to the servo control unit 31B. The servo control unit 31B can selectively use either one of the focusing error signals in accordance with the operation mode designated by the operation mode control unit 31A. As compared with the differential astigmatism method, the crosstalk component is more liable to be generated in the focusing error signal formed on the basis of the astigmatism method. When the focusing servo control based on the astigmatism method is executed, therefore, by using the correction data set B by the liquid crystal element control unit 32, the generation of the crosstalk component can be suppressed, the focusing servo can be stabilized, and a damage of the objective lens 18 (peel-off of the reflection preventing film or the dissolution of the lens material) can be prevented.

The temperature sensor 34 can measure a temperature of the optical pickup 3. When the measured temperature exceeds a predetermined temperature, the liquid crystal element control unit 32 may read out, from the nonvolatile memory 32A, the correction data set which has been set so that the refractive index distribution which can suppress the generation of the noise component in the servo signal is formed in the liquid crystal element 16.

The invention claimed is:

1. An optical recording and reproducing apparatus equipped with an optical pickup having a light source for emitting a light beam, a liquid crystal correcting element which includes a liquid crystal layer arranged between two electrode layers which face each other and modulates a phase of said light beam, an objective lens for converging said modulated light beam onto a signal recording surface of an optical recording medium, and an optical system for guiding said light beam to said liquid crystal correcting element, comprising:
   a memory for storing a plurality of correction data sets respectively corresponding to a plurality of refractive index distribution to be formed by said liquid crystal correcting element;
   an operation mode control unit for designating an operation mode of said optical pickup;
   a liquid crystal element control unit for selectively reading out the correction data set corresponding to the operation mode designated by said operation mode control unit from said memory and applying a driving voltage according to said read-out correction data set to said electrode layers;
   a signal detecting unit for forming a servo signal on the basis of the return light beam reflected by said signal recording surface; and
   a servo control unit for controlling an operation of said optical pickup on the basis of said servo signal in the operation mode designated by said operation mode control unit,
   wherein when said operation mode control unit designates a seek operation mode, said liquid crystal element control unit selectively reads out, from said memory, the correction data set which has been set so that the refractive index distribution which minimizes a generation amount of a noise component contained in a focusing error signal at the time of the seeking operation of said optical pickup is formed in said liquid crystal layer.

2. An optical recording and reproducing apparatus according to claim 1, wherein when said operation mode control unit designates an operation mode for executing tracking servo control, said liquid crystal element control unit selectively reads out, from said memory, the correction data set which has been set so that the refractive index distribution which minimizes a generation amount of a predetermined wavefront aberration component is formed in said liquid crystal layer.

3. An optical recording and reproducing apparatus according to claim 1, wherein when said operation mode control unit designates an operation mode for executing focusing servo control based on an astigmatism method, said liquid crystal element control unit selectively reads out, from said memory, the correction data set which has been set so that the refractive index distribution which minimizes a generation amount of a noise component contained in a focusing error signal which is formed on the basis of the astigmatism method is formed in said liquid crystal layer.

4. An optical recording and reproducing apparatus according to claim 3, wherein when said operation mode control unit designates an operation mode for executing focusing servo control based on a differential astigmatism method, said liquid crystal element control unit selectively reads out, from said memory, the correction data set which has been set so that the refractive index distribution which minimizes a generation amount of the predetermined wavefront aberration component is formed in said liquid crystal layer.

5. An optical recording and reproducing apparatus according to claim 1, further comprising a medium discriminating unit for discriminating a kind of said optical recording medium, wherein said liquid crystal element control unit selectively reads out, from said memory, the correction data set corresponding to the kind of said optical recording medium in accordance with a result of said discrimination.

6. An optical recording and reproducing apparatus equipped with an optical pickup having a light source for emitting a light beam, a liquid crystal correcting element which includes a liquid crystal layer arranged between two electrode layers which face each other and modulates a phase of said light beam, an objective lens for converging said modulated light beam onto a signal recording surface of an optical recording medium, and an optical system for guiding said light beam to said liquid crystal correcting element, comprising:
   a memory for storing a plurality of correction data sets respectively corresponding to a plurality of refractive index distribution to be formed by said liquid crystal correcting element;
   an operation mode control unit for designating an operation mode of said optical pickup:
   a liquid crystal element control unit for selectively reading out the correction data set corresponding to the operation mode designated by said operation mode control unit from said memory and applying a driving voltage according to said read-out correction data set to said electrode layers; and
   a signal detecting unit for forming a servo signal on the basis of the return light beam reflected by said signal recording surface; and a servo control unit for controlling an operation of said optical pickup on the basis of said servo signal in the operation mode designated by said operation mode control unit,
   wherein when said operation mode control unit designates an operation mode in which a test signal for an optimum recording power calibration (OPC) of said light beam is recorded onto said optical recording medium, said liquid crystal element control unit selectively reads out, from said memory, the correction data set which has been set so that the refractive index distribution which minimizes a generation amount of a noise component contained in said servo signal at the time of recording the test signal is formed in said liquid crystal layer.

7. An optical recording and reproducing apparatus according to claim 6, wherein when said operation mode control unit designates an operation mode in which said test signal is read out of said optical recording medium, said liquid crystal element control unit selectively reads out, from said memory, the correction data set which has been set so that the refractive index distribution which minimizes a generation amount of a predetermined wavefront aberration component at the time of reading out the test signal is formed in said liquid crystal layer.

* * * * *